Aug. 26, 1941.     C. S. DRAPER     2,254,172
VIBRATION MEASURING APPARATUS
Filed May 18, 1937     3 Sheets-Sheet 1
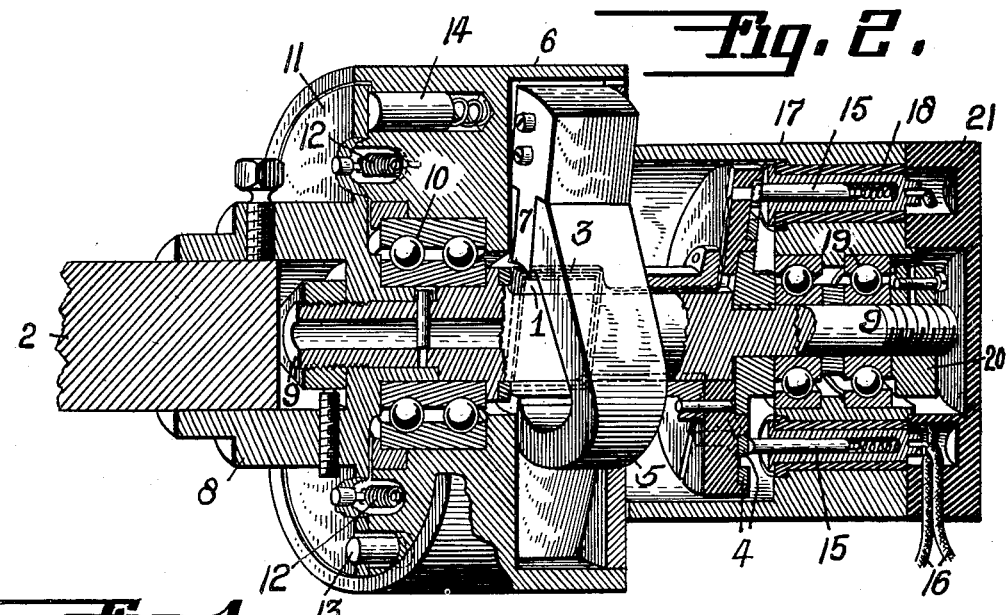
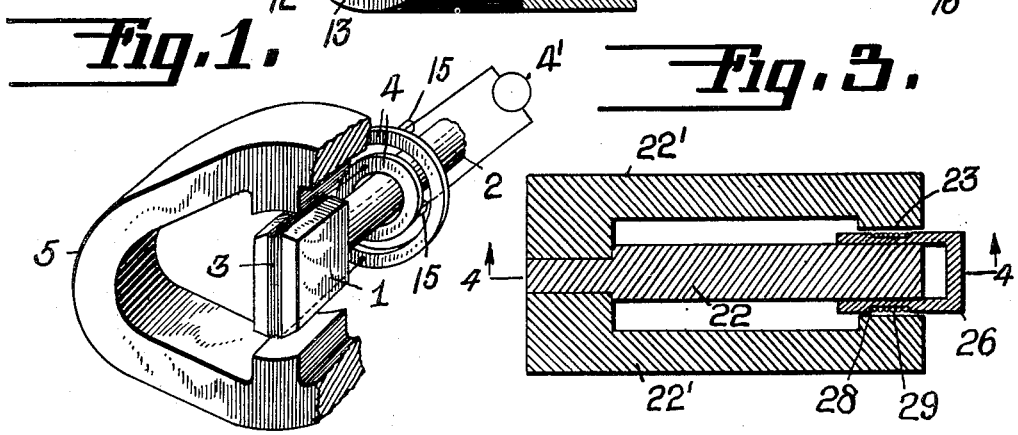
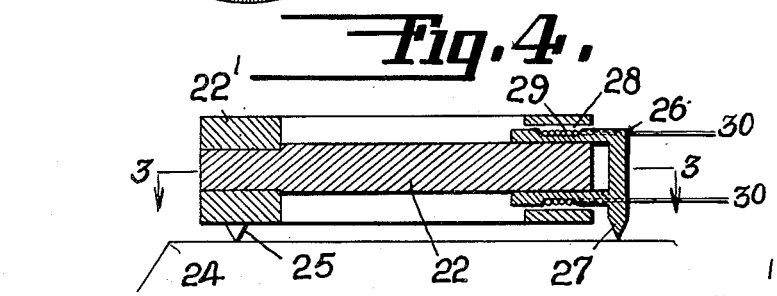
INVENTOR
Charles S. Draper
BY
HIS ATTORNEY

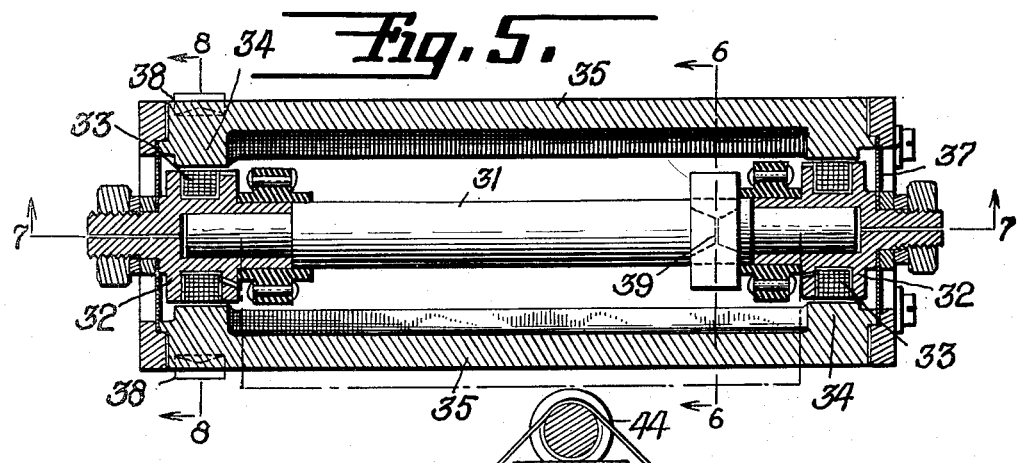
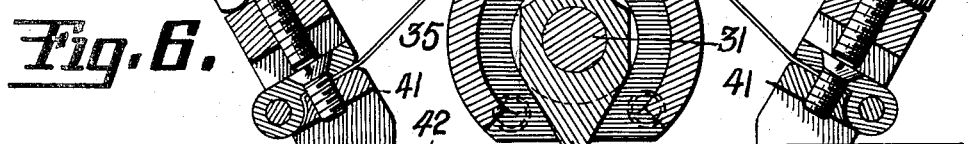
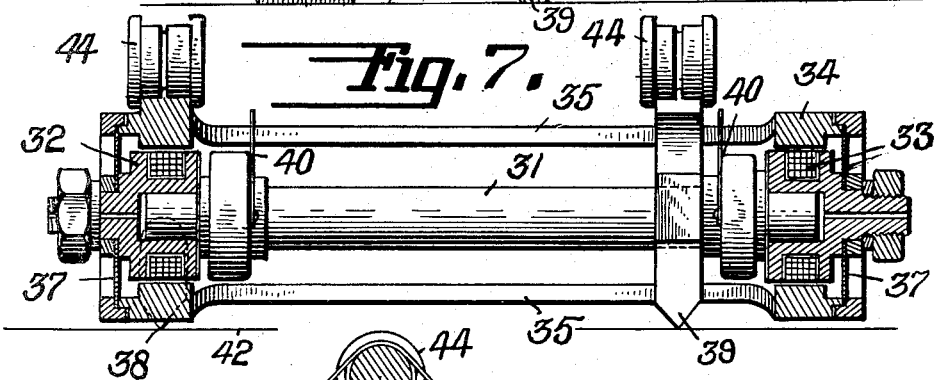
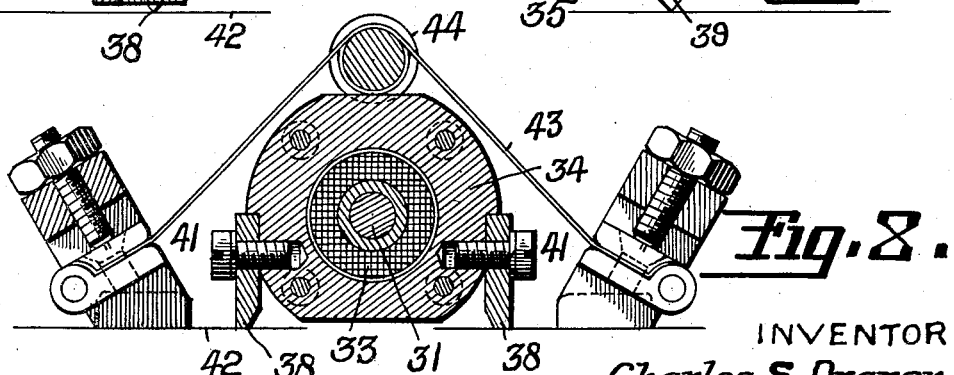

Aug. 26, 1941.　　　C. S. DRAPER　　　2,254,172
VIBRATION MEASURING APPARATUS
Filed May 18, 1937　　　3 Sheets-Sheet 3
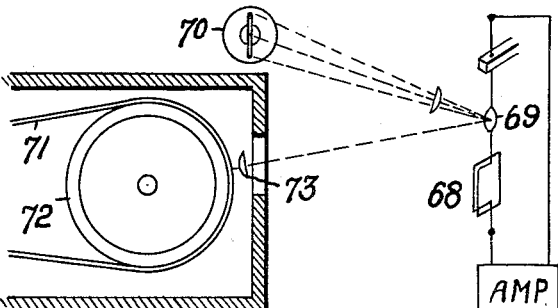
Fig. 9.
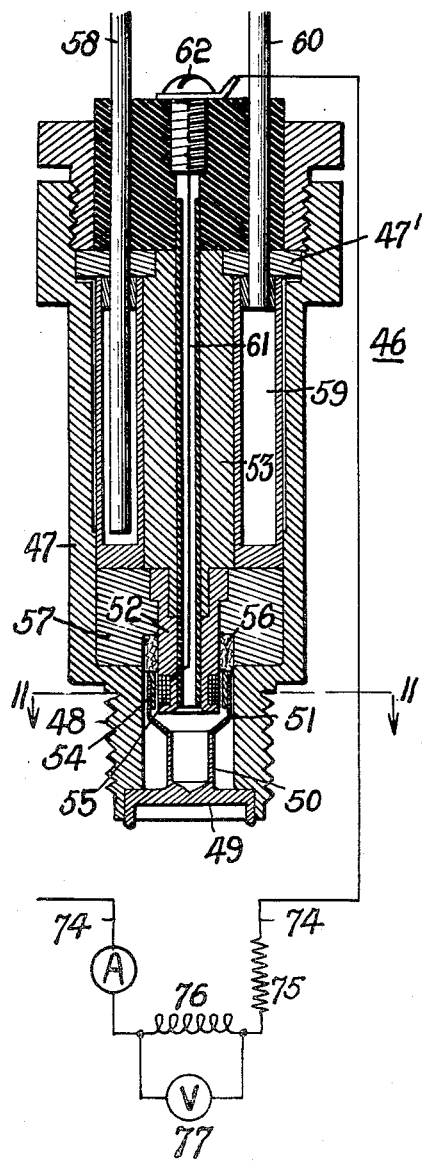
Fig. 10.
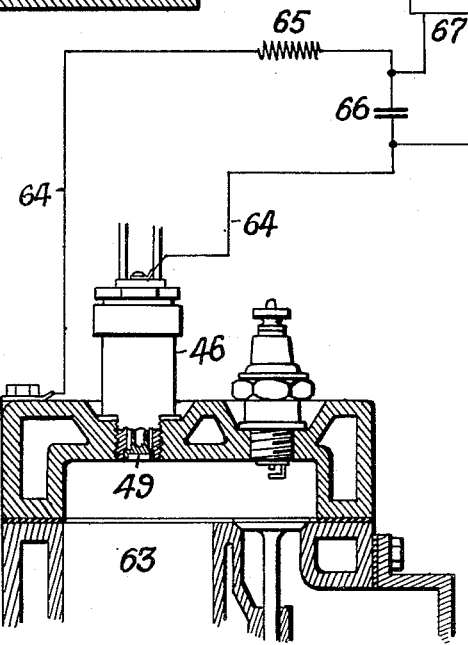
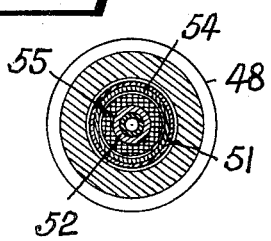
Fig. 11.
INVENTOR
Charles S. Draper
BY
Herbert H. Thompson
HIS ATTORNEY.

Patented Aug. 26, 1941

2,254,172

UNITED STATES PATENT OFFICE 2,254,172

VIBRATION MEASURING APPARATUS

Charles S. Draper, Boston, Mass., assignor to Research Corporation, New York, N. Y., a corporation of New York Application May 18, 1937, Serial No. 143,269

5 Claims. (Cl. 171—209)

This invention relates, generally, to the measurement of the amplitude and frequency of vibratory motion, and the invention has reference, more particularly, to a novel vibration measuring apparatus adapted for converting a small portion of the energy of vibration of bodies or fluids into electrical voltage impulses that are employed for visually indicating or recording either the amplitude of such vibration, or the first or second time derivatives thereof.

In my copending application joint with George P. Bentley, now Patent No. 2,251,436, dated August 5, 1941 there is disclosed novel vibration measuring and recording apparatus adapted for measuring the linear vibration of a body in any desired direction. The said apparatus employs an electromagnetic generator having a relatively long voltage generating coil extending through and beyond the ends of the airgap of a magnet to which the coil is relatively weakly mechanically coupled, so that relative motion of the coil and air gap generates voltage in the coil proportional to the velocity of the vibrating motion, the use of a relatively strong or stiff mechanical coupling between the magnet and the coil alternatively serving to generate voltage in the coil proportional to the acceleration of the vibratory motion.

The principal object of the present invention is to provide vibration measuring apparatus for measuring additional types of vibration, one form of the said apparatus being adapted for converting torsional vibration energy into electrical energy to be used in indicating or recording torsional vibratory displacements or time derivatives thereof, while another form of the invention is adapted for converting the energy of fluctuating mechanical strains into electrical energy to be used in indicating or recording the magnitude of such vibratory strains or time derivatives thereof, while still another form of the invention is adapted for converting fluid pressure wave energy into electrical energy to be used in indicating or recording the magnitude of such pressure waves or time derivatives thereof.

Another object of the present invention lies in the provision of novel apparatus of the above character for measuring, indicating, and/or recording the desired vibration without appreciably affecting the vibration characteristics of the member or means investigated, the said invention also being adapted for enabling the measurement and recording of such vibration at one or more remote points by use of a portable central unit or units convenient to the operator.

Still another object of the present invention is to provide a novel vibration measuring apparatus including an electromagnetic generator for generating a voltage proportional to the velocity of the vibration under consideration, the said apparatus also preferably including either an integrating circuit for electrically integrating the output of the generator where it is desired to indicate or record displacement of the vibration, or including a differentiating circuit where it is desired to indicate or record the acceleration of the vibration, the output of the integrating or differentiating circuit, as the case may be, being preferably amplified and then employed for operating an oscillograph galvanometer, preferably used in conjunction with a photographic recorder, whereby a permanent record of the vibration is obtained.

Still another object of the present invention is to provide a novel apparatus of the above character that is of simple, rugged construction, the same being adapted to maintain its calibration over a long period of time, whether used for measuring torsional, strain or detonation vibrations, and being further adapted to measure vibrations over a wide range of frequencies, which latter feature, together with the feasibility of installing the recording system at a distance from the point at which vibration is measured, renders the apparatus especially suitable for use in connection with aircraft or other conveyance in motion.

Other objects and advantages will become apparent from the specification, taken in connection with the accompanying drawings wherein the invention is embodied in concrete form.

In the drawings,

Fig. 1 is a perspective schematic view of an electro-magnetic generator adapted for use in a torsional vibration pick-up.

Fig. 2 is a vertical sectional perspective view of a preferred form of torsional vibration pick-up unit.

Fig. 3 is a transverse sectional schematic view of an electromagnetic generator for converting the energy of fluctuating mechanical strains into electrical energy, taken along line 3—3 of Fig. 4.

Fig. 4 is a sectional elevational view of the structure of Fig. 3, taken along line 4—4 of Fig. 3.

Fig. 5 is a transverse sectional view of an electromagnetic generator or strain gauge for converting the energy of fluctuating mechanical strains into electrical energy.

Fig. 6 is a sectional view taken along line 6—6 of Fig. 5, showing also the hold-down means used.

Fig. 7 is a part sectional view taken along line 7—7 of Fig. 5.

Fig. 8 is a view similar to Fig. 6, but taken along line 8—8 of Fig. 5.

Fig. 9 is a schematic view illustrating an electromagnetic generator arranged for use in connection with a detonation indicator, the output of the pick-up unit being shown as integrated and amplified for operating a recording instrument.

Fig. 10 is an enlarged sectional view of the detonation pick-up unit of Fig. 9 and also shows the use of this unit with a differentiating circuit.

Fig. 11 is a sectional view taken along line 11—11 of Fig. 10.

Referring now to Fig. 1, there is shown schematically a torsional vibration pick-up unit having an armature 1 of material of high magnetic permeability, such as iron, the said armature being rigidly attached to the shaft 2, such as the crank shaft of an internal combustion engine, whose torsional vibrations are to be measured. A coil of fine wire 3 is wound in a suitable recess in the armature 1 and electrically insulated therefrom and has its ends connected to slip rings 4. A magnet 5 is mounted coaxially with the shaft 2 so that it is restrained from rotation about the shaft axis by weak springs (not shown in Fig. 1), which springs serve to couple the magnet 5 to the shaft 2 and thereby position the magnet so that its poles are close to and symmetrically disposed with respect to the armature 1. The airgap between the poles of the magnet 5 and the armature 1 is very small, this airgap being greatly enlarged in the figure purposely to facilitate the illustration. Since the airgap between those portions of armature 1 at either side of coil 3 and the poles of magnet 5 can be made very small, two low reluctance flux paths are thus provided for the magnet flux at the sides of coil 3.

Due to the presence of the weak coupling springs, the magnet 5 rotates with the average angular velocity of shaft 2, and with the magnet 5 properly damped, the same is substantially free of angular velocity variations at frequencies two or three times in excess of the natural torsional frequency of the magnet system on its bearings. Hence, the torsional vibration of shaft 2 produces relative motion between armature 1 and magnet 5 substantially equal to the magnitude of the vibration, resulting in a transfer of flux from one side portion of the armature across coil 3 to the other side portion of this armature. Such flux transfer induces a voltage in coil 3 proportional to the relative angular velocity of the armature and magnet, and therefore substantially proportional to the velocity of torsional vibration of the shaft, the induced voltage being transferred through the slip rings 4 to a non-rotating member, such as the torsional vibration velocity indicator 4' of the voltmeter type. Owing to the high flux density obtaining through the armature 1 and the magnet poles at either side of coil 3, relative movement of the armature and magnet poles produces relatively high velocity potentials in the coil 3 so that this electromagnetic pick-up unit is highly efficient in use, a small unit providing a relatively large voltage output, and hence the same is very sensitive.

Should it be desired to indicate the magnitude of the torsional vibrational displacement of the shaft, the output from the slip rings 4 may be applied to an integrating circuit, such as shown in Fig. 9 (to be described) and also disclosed in my prior joint application previously referred to. Likewise, should it be desired to indicate the acceleration of the torsional vibration of the shaft, I connect the slip rings 4 to a differentiating circuit such as shown in Fig. 10, as will further appear, and also disclosed in my previously mentioned joint application.

In Fig. 2 there is shown a practical construction of torsional pick-up unit incorporating the principles of Fig. 1, and parts of Fig. 2 corresponding to those of Fig. 1 are similarly numbered. In this figure, the seismic element consists of a cylinder 6, which may be of brass and which rigidly carries the permanent magnets 5, two such magnets being used and having common pole pieces 7. The shaft 2 fixedly carries a flanged collar 8, and a shaft 9, preferably of bronze, is secured to collar 8 and is arranged coaxially with shaft 2 to turn therewith. A ball bearing 10 fits over the shaft 9 and supports the seismic element in place. The cylinder 6 of this element is coupled to the flanged 11 of collar 8 through weak springs 12 having their ends connected to the flange 11 and cylinder 6, respectively, the cylinder 6, together with the magnets 5, essentially constituting the seismic element.

Relative motion between the seismic element and the flange 11 is limited to about 10° by a pin 13 carried by the flange 11 and projecting into a slot in the cylinder 6. A spring pressed plug 14 of Bakelite or other suitable material is carried by the drum 6 and engages the flange 11 to furnish the necessary damping for the seismic element. The coil 3 is wound on an armature 1 extending through and secured in a slot in the shaft 9, the output of coil 3 being fed through slip rings 4 and brushes 15 to leads 16. A housing 17, as of aluminum, supports the brush holders 18 and is mounted on shaft 9 by means of ball bearings 19. The housing 17 is stationary and does not constitute a part of the seismic element. The brush assembly is held in place by a split clamp nut 20 and an insulating cap 21 overlies the end of the structure and holds the leads 16 in place. As stated in connection with Fig. 1, the output of leads 16 may be used either to indicate the velocity of the torsional vibration of shaft 2, as by conveying these leads to opposite sides of the voltmeter 4', or the same may be connected to an integrating or a differentiating circuit for giving the displacement or acceleration of the vibration.

The flux transfer method of electromagnetic induction used in Figs. 1 and 2 is also applicable to the measurement of small fluctuating motions between points, such as occurs in the case of strains in a body due to vibration, as in the cylinder head of an internal combustion engine wherein the strains are due to vibration and to variations in fluid pressure within the engine cylinders. Thus, in Figs. 3 and 4 an electromagnetic generator is shown for converting such fluctuating mechanical strains into electrical energy. Thus, in these figures a magnet means 22 consisting of a central cylindrical magnet and flux conducting external legs 22' is employed for maintaining a radial magnetic field in an annular airgap 23 between the free end portions of legs 22' and the main body of magnet 22. This magnet 22 is attached fixedly and against movement with respect to the body 24, the strains of which are to be measured, through the use of a knife edge or other suitable attaching member 25, this attaching member permitting free flexure of the body 24 while moving with the body. An armature 26 of material of high magnetic permeability is of substantially annular shape and projects into the airgap 23, the same fitting fairly closely in the airgap so as to reduce the reluctance of the magnetic circuit to a minimum, while the same is nevertheless freely slidable longitudinally of this airgap, i. e., upon the main or central cylindrical portion of the magnet 22. The armature 26 is provided with a knife edge member 27 for fixedly engaging the body 24. This armature has an annular recess 28 therein of less width than that of the airgap 23, the recess 28 being approximately symmetrically located with respect to the transverse center of the airgap 23, so that the armature provides low reluctance flux paths between the central cylindrical portion of magnet 22 and the legs 22' thereof at each side of recess 28. A coil of wire 29 is wound in the recess 28 though insulated from the armature, the ends of this wire terminating in leads 30. Any fluctuating change in the length of the body 24 between the knife edges 25 and 27 causes an equal relative motion between armature 26 and magnet 22, thereby causing a transfer of magnetic flux from one side of recess 28 to the other side thereof and inducing a voltage across the leads 30 proportional to the velocity of the relative motion, and therefore proportional to the velocity of strain for all fluctuating frequencies. Since the response to the strain pick-up is a function of velocity only, accurate centralization of the armature is not essential.

A practical form of the strain gauge of Figs. 3 and 4 is illustrated in Figs. 5 to 8. In these figures, a cylindrical magnet 31 has armatures 32 fixed upon its ends, which armatures carry coils 33 connected in series and substantially centrally disposed with respect to pole pieces 34 provided on magnet or core legs 35 of magnetic conducting material, so that flux from magnet 31 passes through armatures 32 at each side of coils 33 into the pole pieces 34 and through the core legs 35. The assembled magnet 31 and armatures 32 are carried by spring metal disc members 37 that are secured at their peripheries to the annular pole pieces of core legs 35 and are apertured at their centers and secured to the armatures 32, as by nuts, as shown.

The core legs 35, at a common end of the pick-up unit, carry knife edge members 38 for engaging the body 42 whose strain vibrations are to be measured. The magnet 31 also carries a knife edge member 39 near the other end of the pick-up unit for engaging the body whose strains are to be measured. Thus, a three point support is provided for the pick-up upon the body under test. Any fluctuating change in the length of the member between the knife edge 39 and knife edges 38 causes an equal relative motion between armatures 32 and pole pieces 34, thereby causing a transfer of magnetic flux from one side of the armature coils 33 to the other side thereof and inducing a voltage across the output leads 40, just as in the form of the invention shown in Figs. 3 and 4. This output voltage may be used to indicate the velocity of the vibrational strain directly, or may be either integrated or differentiated to obtain the displacement or acceleration of such strains through the use of integrating or differentiating circuits. The use of two coils in addition to doubling the sensitivity of the instrument tends to reduce output irregularities peculiar to either coil when used alone.

In order to hold the instrument down upon the body 42 being tested, brackets 41 are shown attached to the body 42, which brackets are adapted to clamp wires or other flexible connectors 43 to the body. These wires or connectors pass over cylindrical spool-like members 44 provided on one of the pole piece structures 34 above knife edges 38 and on knife edge member 39, respectively.

In the form of the invention shown in Figs. 9 to 11, an electrical pick-up unit 46 is disclosed, using the flux transfer method of the previous figures for producing a voltage proportional to the velocity of the fluid pressure wave energy obtaining within a closed chamber, such as in the cylinder of an internal combustion engine. It is known that in the operation of an internal combustion engine, pressure waves exist in the cylinder chamber before knocking becomes audible. These pressure waves greatly increase in intensity when the characteristic sound of detonation appears.

The electrical pick-up unit 46 of Figs. 9 to 11 comprises a cylindrical iron or other magnetic shell 47 having a threaded lower plug portion 48 for threading in a suitable opening in the body, such as an engine cylinder head, being tested; for example, the plug portion 48 may be threaded into a spark plug opening. A diaphragm 49, preferably of steel, is secured at its periphery to the bottom of the hollow plug portion 48 of the pick-up unit 46. This diaphragm has an upstanding thin walled, stout tubular body 50 provided with an enlarged flared open upper portion 51 of cylindrical shape that has a close though free sliding fit within plug portion 48 and surrounds an armature 52 of cylindrical shape that depends from the lower end of a cylindrical magnet 53. The upper portion 51 of the body 50 carries an annular member 54 of high magnetic permeability that closely surrounds the armature 52, though longitudinally slidable with respect thereto, the said annular member 54 being of such width as to extend beyond the sides of a coil 55 provided in an annular recess of the armature 52, whereby members 54 and 51 provide a low reluctance path for flux passing from armature 52 at the sides of coil 55 into shell 47 that together with a ring member 47' completes the flux path for magnet 53.

Packing or other damping material 56 is contained in a cylindrical block 57 of brass or other non-magnetic material, and presses upon the upper end of the member 54 for suitably damping the vibrations of diaphragm 49. If desired, the pick-up unit 46 may be kept cool in use by circulating cooling water inwardly through a pipe 58 around an annular chamber 59 in the body of pick-up 46 and then out through pipe 60. One end of the coil 55 is grounded upon the pick-up unit, whereas the other end is connected by lead 61 to the terminal screw 62.

Pressure waves within the cylinder 63 are conveyed to the diaphragm 49 to produce vibration of this diaphragm substantially in proportion to the velocity of the pressure waves, thereby causing tubular body 50 and annular member 54 to move with respect to coil 55, thereby causing flux transfer from one side to the other of this coil and inducing a voltage between lead 61 and the casing of the pick-up unit that is a measure of the velocity of the pressure wave vibration. This velocity may be read on an indicator or A. C.

meter preferably having a long time lag, such as a suitable A. C. voltmeter, as illustrated in Fig. 1, or in Fig. 9 this voltage is conveyed by leads 64 to an integrating circuit. This integrating circuit comprises a series circuit consisting of a resistor 65 and a capacitor 66. If the voltage across leads 64 be $e$ volts and the resistor 65 and the capacitor 66 be proportioned so that, over a working range of frequencies, the electric impedance of the capacitor is small compared to that of the resistor, the instantaneous voltage $e_c$ across the capacitor 66 will be substantially proportional to the time integral of the induced voltages $e$, expressed mathematically:

$$e_c = K \int_0^t e\,dt$$

where K is a proportionality constant. Thus, the output across the capacitor 66 is proportional to the displacement of the pressure vibrations caused from detonation, and this output may be amplified by an amplifier 67 that may be combined with the integrating circuit and/or applied to a galvanometer 68 having a movable mirror 69 that serves to reflect the light from source 70 onto a moving film 71 carried by a drum 72, whereby a trace of the reflected light beam, condensed by a lens system 73, is formed on the film 71 to provide a permanent record of the displacement values. The outputs of the pick-up units of the preceding figures may be similarly integrated and recorded, if desired.

In Fig. 10, the output of the electrical pick-up unit 46 is shown applied across the leads 74 of a series differentiating circuit consisting of a resistor 75 and an inductor 76. If the resistor and inductor are proportioned so that, over the working range of frequencies the electrical impedance of the inductor is low as compared with that of the resistor, the instantaneous voltage across the inductor 76, as measured by voltmeter or other A. C. meter 77, will be substantially proportional to the instantaneous time rate of change of the supply voltage, i. e., to the acceleration of the fluid pressure vibration.

Inasmuch as the diaphragm 49 is within the cylinder 63, it correctly and accurately vibrates in synchronism with the velocity of the pressure waves obtaining therein, so that the output of the instrument truly records conditions within the cylinder, which would not be true were the diaphragm 49 removed from the cylinder and connected thereto by a passage.

The packing 56 serves to suitably dampen the vibrations of diaphragm 49, whereby sudden shocks, which would otherwise cause the diaphragm to execute a natural frequency vibration for a relatively long period, only cause this damped diaphragm to execute a relatively few natural frequency cycles, so that the voltage output of the coil 55 is substantially unaffected by the natural frequency of the diaphragm 49 and is a true indication of the actual velocities of the pressure waves obtaining within the cylinder 63.

The mass of the armatures and connected parts of the forms of the invention shown in Figs. 1 to 8 and the mass of the diaphragm 49 and connected parts in the form of the invention shown in Figs. 9 to 11 are small, and hence the reactions of these members on the strucures to which the pick-up units are attached is substantially negligible, thereby eliminating any appreciable distortion of the vibration of the structures by the attachment of the pick-up units thereto.

Should the seismic elements of the forms of the invention shown in Figs. 1 to 8 be coupled by the use of relatively stiff springs, i. e., if springs 12 and 37 are made relatively stiff so that the force exerted thereby is large compared to the vibratory acceleration force, then the yield of these springs will be proportional to the instantaneous accelerations so that the voltage output of the pick-up units will be proportional to the rate of change of the acceleration of the vibratory motion being measured, which voltage, when integrated in a circuit such as that shown in Fig. 9, furnishes a voltage proportional to acceleration which may be recorded by the means shown in that figure.

Although the form of the invention shown in Figs. 9 to 11 has been described as a detonation indicator, it will be understood that the same is equally useful for indicating or measuring the normal pressure fluctuations taking place in an engine cylinder during operation, thereby disclosing the actual operating conditions of the engine, whereby inefficient operation may be readily detected and hence rectified. This information, either viewed directly as on a screen or as recorded, can be readily analyzed to determine conditions of operation. Likewise, the use of the form of the invention shown in Figs. 3 to 8 on an integral combustion engine will give an indication of engine performance, simulating the detonation indications of the apparatus of Figs. 9 to 11, while the use of the form of the invention shown in Figs. 1 and 2 on the engine crank shaft will give an indication of crank shaft torsional vibration or functions thereof.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an apparatus for measuring fluctuating mechanical strains in a body such as an engine cylinder head, magnet means having a knife edge for fixedly engaging the body, said magnet means providing an airgap, a resiliently supported armature movable within said airgap and also provided with a knife edge for engaging said body, a coil carried by said armature, means for holding said knife edges down upon the body, the fluctuating mechanical strains in the body between said knife edges producing relative motion between said magnet means and said armature, to thereby induce potentials in said armature coil responsive to said fluctuating strains.

2. A means for converting energy of mechanical strain into electric energy, comprising, in combination, a magnet for establishing a radial magnetic field in an annular airgap, means for securing said magnet at one point of the structure subjected to strain, a substantially cylindrical armature of material having a magnetic permeability high compared to that of air provided with means for securing to another point on said structure and extending through the annular airgap of said magnet, resilient means connecting said magnet and armature and restraining relative motion therebetween to a line coaxial therewith, said armature fitting closely within the airgap to reduce reluctance of the magnetic circuit to a minimum, a coil of wire wound in a recess on said armature and electrically insulated therefrom, and means for electrical connection to the terminals of said coil, said armature and coil being so disposed in said magnetic field that strain in said structure causes motion of said armature along its axis in said magnetic field, thereby causing a transfer from one side of said coil to the other of magnetic flux existing in a substantially all metal high permeability path, thereby inducing a voltage between the coil terminals substantially proportional to the velocity of mechanical strain on said structure between the points of attachment of the device.

3. A device for measuring mechanical vibration of a body generating an electric potential proportional to the velocity thereof, comprising magnetic flux carrying members, one of said members at least partially surrounding and being spaced from another of said members to provide an annular airgap therebetween, said other member including a permanently magnetized portion, an armature substantially closing said airgap and having an annular central groove, a coil supported in said groove, mechanical means including knife edge connections to the body for causing a symmetrical differential change of flux from one side to the other of said coil responsive to, and substantially proportional to the displacement of the vibration of the body being measured between said knife edge connections without altering the radial length of said gap, thereby causing an effective shift of flux relative to said coil in the direction of said displacement, the length of said gap in the direction of said flux shift being substantially greater than the length of said coil in the same direction whereby the potential generated in said coil by said flux shift is caused to be proportional to the velocity of vibration over a wide range of amplitude of displacement.

4. In an apparatus for measuring fluctuating mechanical strains existing between two points in a body, magnet means arranged to be fixedly connected to one point of the body and having a substantially annular airgap, an armature extending within said airgap closely surrounding a portion of said magnet means and also arranged to be fixedly connected to said body at a second point removed from the first point of connection of said magnet means thereto, said armature having a coil, said coil being of lesser width axially than said airgap, the vibratory strain within said body between said points serving to produce relative motion between said armature means and said magnet means resulting in the transfer of flux from one side portion of said armature across said coil to the other side portion thereof, causing the generation of voltage in said armature coil for use in indicating a function of said vibratory strains.

5. In an apparatus for measuring fluctuating mechanical strains in a body, magnet means adapted to be connected to the body and having a substantially annular airgap between opposed portions thereof, an armature extending across said airgap with but sliding clearance and also adapted to be connected to said body at a point removed from the connection of said magnet means thereto, said armature having an annular groove, a coil within said groove, resilient means for normally positioning said armature coil centrally within said airgap, said resilient means permitting limited motion along the axis of said airgap, the relative motion of said magnet means and said armature coil causing flux to be transferred from one side of said armature coil to the other, thereby inducing potentials in said armature coil responsive to said fluctuating mechanical strains.

CHARLES S. DRAPER.